Sept. 18, 1945.  C. A. ROSWELL  2,384,861
REFRIGERATION
Filed April 2, 1943  2 Sheets-Sheet 2
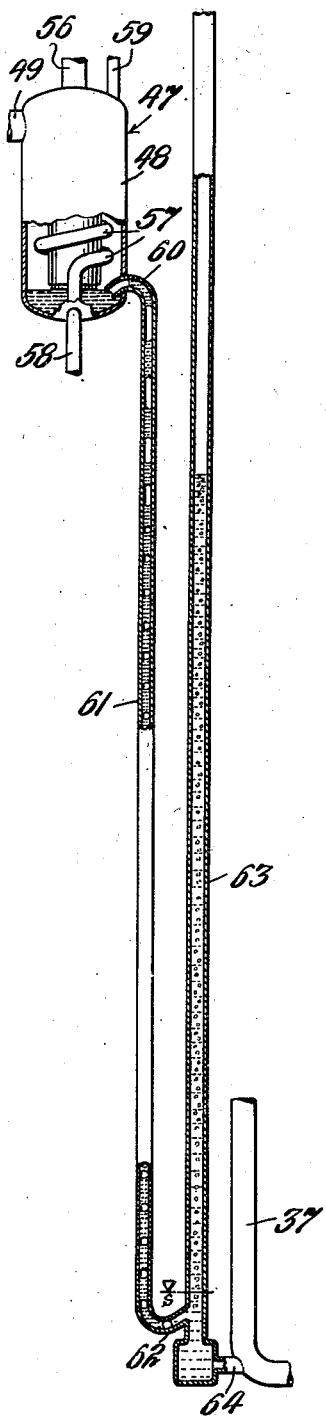
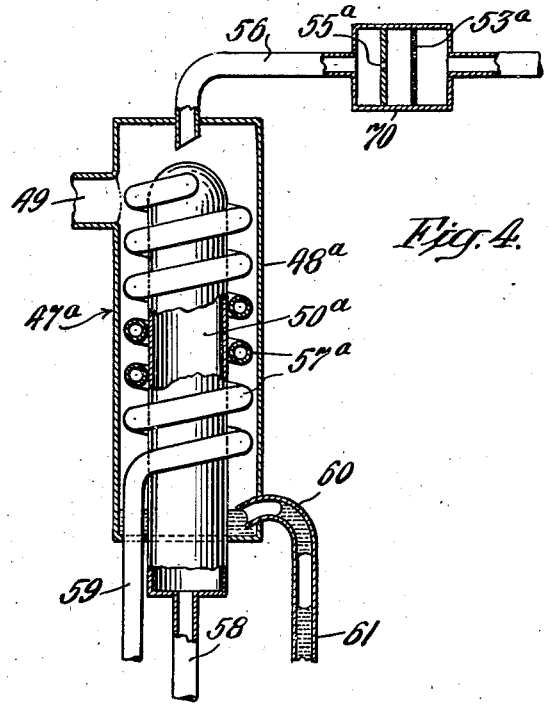
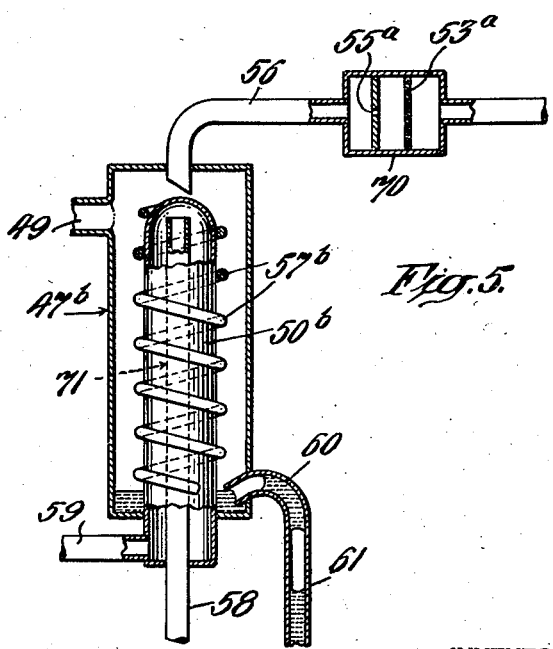
INVENTOR
Charles Alfred Roswell
BY
ATTORNEY Patented Sept. 18, 1945

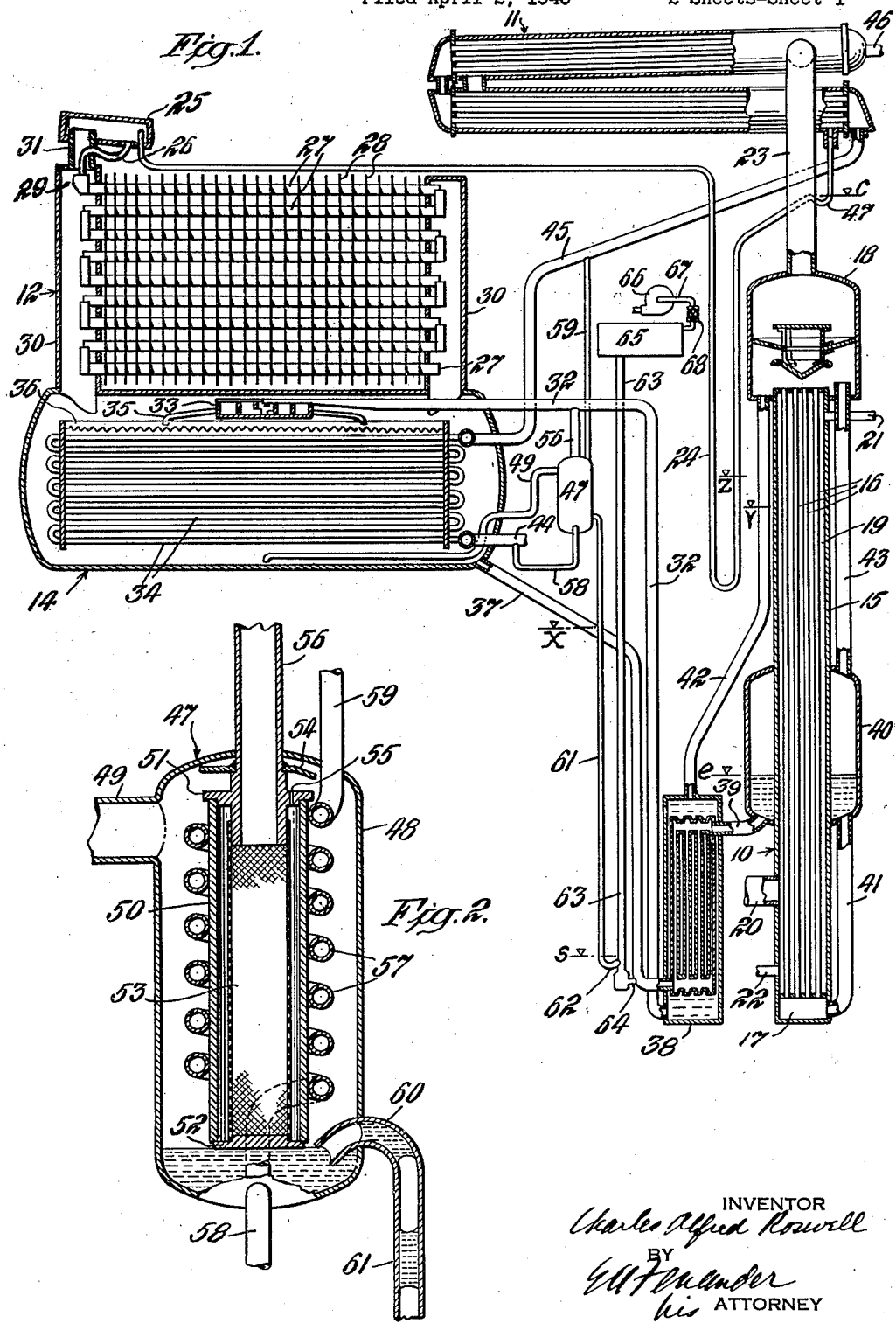

2,384,861

UNITED STATES PATENT OFFICE 2,384,861

REFRIGERATION

Charles Alfred Roswell, Newburgh, Ind., assignor to Servel, Inc., New York, N. Y., a corporation of Delaware Application April 2, 1943, Serial No. 481,519

12 Claims. (Cl. 62—119)

REISSUED

This invention relates to refrigeration, and more particularly to refrigeration systems of the absorption type.

It is an object of the invention to provide an improvement in refrigeration systems for transferring and removing non-condensible gases from one part, such as an absorber, for example, to another part of the system. More specifically, it is an object to provide an improved auxiliary absorber for establishing positive flow of non-condensible gases from an active part, such as the main absorber, for example, and to divert into such auxiliary absorber a part of the absorption liquid flowing to the main absorber. The auxiliary absorber is relatively small compared to the part of the system from which the non-condensible gases are withdrawn in order that such gases may be localized in a small space.

By bringing the withdrawn non-condensible gases into intimate contact with absorption liquid, refrigerant vapor accompanying the gases withdrawn from the main absorber is absorbed into solution, whereby the non-condensible gases are deprived of as much refrigerant vapor as possible. The absorption liquid, after being utilized to absorb refrigerant vapor from the non-condensible gases, is employed to transfer the gases to a part of the system from which the gases may be exhausted to the atmosphere from time to time by a suitable vacuum pump.

The invention, together with the above and other objects and advantages thereof, will be better understood from the following description taken in connection with the accompanying drawings forming a part of this specification, and of which:

Fig. 1 more or less diagrammatically illustrates a refrigeration system embodying the invention;

Figs. 2 and 3 are enlarged fragmentary views of parts shown in Fig. 1 to illustrate the invention more clearly; and Figs. 4 and 5 are fragmentary views similar to Fig. 2 illustrating modifications of the invention.

Referring to Fig. 1, the invention is embodied in a two-pressure absorption refrigeration system like that described in United States Letters Patent No. 2,282,503 of A. R. Thomas and P. P. Anderson, Jr., granted May 12, 1942. A system of this type operates at low pressures and includes a generator or vapor expeller 10, a condenser 11, an evaporator 12 and an absorber 14 which are interconnected in such a manner that the pressure differential in the system is maintained by liquid columns. The disclosure in the aforementioned Thomas and Anderson patent may be considered as being incorporated in this application, and, if desired, reference may be made thereto for a detailed description of the refrigeration system.

In Fig. 1 the generator includes an outer shell 15 within which are disposed a plurality of vertical riser tubes 16 having the lower ends connected to receive liquid from a space 17 and the upper ends extending into and above the bottom of a vessel 18. The space 19 within shell 15 forms a chamber to which steam is supplied through a conduit 20 from a suitable source of supply, so that full length heating of the tubes 16 is effected. A vent 21 is provided at the upper end of shell 15, and a conduit 22 is connected to the bottom part of the shell for draining condensate from the space 19.

The system operates at a partial vacuum and contains a water solution of refrigerant in absorbent liquid such as, for example, a water solution of lithium chloride or lithium bromide. When steam is supplied through conduit 20 to space 19 at atmospheric pressure, heat is supplied to tubes 16 for expelling water vapor from solution. The absorption liquid is raised by gas or vapor lift action, the expelled water vapor forming a central core within an upwardly rising annulus of the liquid. In vapor-liquid lifts of this character the expelled water vapor rises more rapidly than the liquid, and the liquid follows the vapor along the inside walls of the tubes 16.

The water vapor discharged from the upper ends of the tubes or risers 16 separates from the raised absorption liquid in the vessel 18 and flows through a conduit 23 into condenser 11. The condensate formed in condenser 11 flows through a U-tube 24 into a chamber 25 and from the latter through a tube 26 into evaporator 12.

The evaporator 12 may include a plurality of horizontal banks of tubes 27 disposed one above the other and having heat transfer fins 28 secured thereto to provide a relatively extendsive heat transfer surface. The liquid flowing to evaporator 12 is divided in any suitable manner for flow through the uppermost bank of tubes 27. For example, the dividing of liquid may be effected by a liquid distributing trough 29 into which the liquid flows from the tube 26. The water flows in successively lower tubes through suitable end connections which are open to permit escape of vapor from the tubes. Any excess liquid refrigerant is discharged from the lowermost tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 27 passes out into end headers 30 which are connected at their lower ends to absorber 14. Any vapor formed in chamber 25 passes through a conduit 31 into one of the headers 30 and mixes with vapor formed in the evaporator 12, so that disturbances in the evaporator due to vapor flashing of incoming liquid are avoided.

In absorber 14 refrigerant vapor is absorbed into absorption liquid entering through a conduit 32. The entering absorption liquid flows into a vessel 33 in which liquid is distributing laterally of a plurality of vertically disposed pipe banks 34 arranged alongside of each other. The liquid flows from vessel 33 through conduits 36 into a plurality of liquid holders and distributors 36 which extend lengthwise of and above the uppermost branches of the pipe banks 34. Absorption liquid is siphoned over the walls of the liquid holders 36 onto the uppermost pipe sections. Liquid drips from each horizontal pipe section onto the next lower pipe section, so that all of the pipe sections are wetted with a film of liquid.

The water vapor formed in evaporator 12 passes through the headers 30 into the absorber 14 where it is absorbed by absorption liquid. Absorption liquid flows from absorber 14 through a conduit 37, a first group of passages in liquid heat exchanger 38, conduit 39, vessel 40, and conduit 41 into the bottom space 17 of generator 10. Water vapor is expelled out of solution in generator 10 by heating, and liquid is raised by gas or vapor lift action in riser tubes 16, as explained above.

The absorption liquid in vessel 18, from which refrigerant has been expelled from solution, flows through a conduit 42, another group of passages in liquid heat exchanger 38 and conduit 32 into the upper part of absorber 14. This circulation of absorption liquid is effected by raising liquid in the vertical riser tubes 16 by vapor lift action, so that liquid can flow from generator 10 to absorber 14 and return from the latter back to the generator by force of gravity.

The upper part of vessel 40 is connected by conduit 43 to vessel 18, so that the pressure in vessel 40 is equalized with the pressure in the upper part of generator 10 and condenser 11. The vessel 40 is of sufficient volume to hold the liquid differential in the system and is of such cross-sectional area that the liquid level therein does not appreciably vary, so that a substantially constant reaction head is provided for lifting liquid in generator 10.

The heat liberated with absorption of water vapor in absorber 14 is transferred to a cooling medium, such as water, which flows upward through the vertically disposed pipe banks 34. The cooling medium enters the lower end of the pipe banks through a conduit 44 and leaves the upper end of the pipe banks through a conduit 45. The conduit 45 may be connected to condenser 11, so that the same cooling medium is utilized to effect cooling of both the condenser 11 and absorber 14. From condenser 11 the cooling medium flows through a conduit 46 to waste.

The system operates at low pressures with the generator 10 and condenser 11 operating at one pressure and evaporator 12 and absorber 14 operating at a lower pressure, the pressure differential therebetween being maintained by liquid columns. Thus, the liquid column formed in tube 24 maintains the pressure differential between condenser 11 and evaporator 12. The liquid column in conduit 37 maintains the pressure differential between the outlet of absorber 14 and generator 10, and the liquid column formed in conduit 32 and connected parts including conduit 42 maintains the pressure differential between the inlet of the absorber and the upper part of the generator 10. In operation, the liquid columns may form in conduits 37, 42 and downleg of tube 24 to the levels $x$, $y$ and $z$, for example. The conduits are of such size that restriction to gas flow is effected without appreciably restricting flow of liquid.

During operation of the refrigeration system non-condensible gases may collect in the system, and in condenser 11 such gases flow toward the dead-end or bottom part of the condenser. To transfer and remove non-condensible gases from condenser 11 to the lower pressure side of the system, a liquid trap 47 is provided in U-tube 24. Liquid formed in condenser 11 flows into trap 47, and, when the trap is completely filled with liquid to the level $c$, the liquid is siphoned from the trap into the downleg of U-tube 24. The gas in the downleg of U-tube 24, in the region between the trap 47 and the liquid level at $z$, is trapped by the liquid siphoned from the liquid trap 47. Immediately after liquid has siphoned from the liquid trap 47, gas passes from the bottom part of condenser 11 through the trap 47 into the downleg of U-tube 24. When liquid passing from condenser 11 again reaches the level $c$ in the trap 47, liquid is again siphoned into the downleg of the tube 24. In this manner gas passing from condenser 11 into the downleg of the tube 24, before the liquid seal is formed in trap 47, is segregated by the liquid subsequently siphoned into the downleg of the tube.

The gas segregated between the successive bodies of liquid siphoned from trap 47 is compressed by the siphoned liquid and passes through the U-tube 24 from condenser 11 to evaporator 12. In this way non-condensible gases collecting in the upper part of generator 10 and condenser 11 are transferred from these parts of the system to the evaporator 12 and absorber 14.

In accordance with this invention an improved auxiliary absorber 47 is provided for removing refrigerant vapor from non-condensible gases withdrawn from the main absorber 14, so that positive flow of non-condensible gases from absorber 14 is effected and at the same time such gases will be deprived of as much refrigerant vapor as possible. The auxiliary absorber 47 is considerably smaller than the main absorber 14 in order to localize the non-condensible gases, and includes an outer shell 48 into the upper part of which the gases pass through a conduit 49 from the bottom part of absorber 14.

Within the shell 48 is disposed a tube 50 having top and bottom closure members 51 and 52, respectively, as shown most clearly in Fig. 2. Concentrically arranged within tube 50 and spaced therefrom is a cylindrical screen 53 having the ends thereof fitting over shoulders formed on the closure members 51 and 52. A liquid deflecting plate 54, which is fixed to an extension of the top closure member 51, is positioned above a small opening or restriction 55 formed in the top closure member. The top closure member 51 serves as an inlet for absorption liquid which is introduced into the auxiliary absorber through a conduit 56. As shown in Fig. 1, the upper end of conduit 56 is connected to the upper part of conduit 32 through which absorption liquid flows to the upper part of absorber 14.

A cooling coil 57 is disposed about and in thermal contact with tube 50. The lower end of coil 57 is connected by a conduit 58 to conduit 44, and the upper end thereof is connected by a conduit 59 to conduit 45. With this arrangement a part of the cooling water flowing to the main absorber 14 through conduit 44 is diverted into coil 57 of the auxiliary absorber 47. The cooling water passing from the upper end of coil 57 joins cooling water in conduit 45 passing from the upper part of the main absorber 14.

To the bottom part of shell 48 is connected the upper curved or rounded portion 60 of a vertically extending tube 61. The lower end of tube 61 is connected at 62 to the bottom part of a vertical conduit 63. The bottom part of conduit 63 in turn is connected by a short conduit 64 to the conduit 37 through which absorption liquid flows from the outlet of absorber 14. It will be observed from the foregoing description that the conduit 56, auxiliary absorber 47, vertical tube 61, lower end of the tube 63 and conduit 64 constitute a by-pass between the conduits 32 and 37 constituting separate paths of flow for absorption solution between the absorber 14 and generator 10. It also will be observed that the by-pass will receive absorption liquid from the conduit 32 at the low pressure prevailing in the absorber 14 and will deliver absorption liquid to the conduit 37 at the high pressure prevailing in the generator 10.

To the upper end of conduit 63 is connected a vessel 65, as shown in Fig. 1. The vertical conduit 63 and vessel 65 constitute the part to which non-condensible gases are transferred from absorber 14, as which will be described presently. A vacuum pump 66 may be connected by a conduit 67 to the vessel 65 for withdrawing non-condensible gases from the system. A suitable valve 68 is provided in conduit 67 to maintain the system at a low pressure.

During operation of the refrigeration system, non-condensible gases may collect in generator 10 and condenser 11 forming the high pressure side of the system. Such gases are swept by the refrigerant vapor flowing from generator 10 into condenser 11 and are carried to the far end of the condenser at the region to which the tube 24 is connected. It is for this reason that trap 41 is provided in the downleg of tube 24 to transfer non-condensible gases from condenser 11 to evaporator 12, as explained above.

The non-condensible gases collecting in the evaporator 12 and absorber 14, which form the low pressure side of the system, are carried to the bottom part of the absorber. This downward movement is imparted to the non-condensible gases by the high velocity refrigerant vapor flowing into the absorber. In a refrigeration system like that described and having an ice melting capacity of five tons, for example, the average velocity of the refrigerant vapor escaping from the evaporator 12 to absorber 14 under ordinary operating conditions is about 130 feet per second. Thus, the high velocity refrigerant vapor forces the non-condensible gases to the bottom of the absorber midway between the headers 30.

In removing and transferring non-condensible gases from absorber 14 to vertical conduit 63 and vessel 65 associated therewith, the auxiliary absorber 47 is utilized to establish positive flow of the gases withdrawn from absorber 14 and also remove as much refrigerant vapor as possible from the withdrawn gases. The absorption liquid diverted from conduit 32 into conduit 56 flows by gravity to the auxiliary absorber into the cylindrical screen 53 therein. Liquid passes through screen 53 into the annular space between the screen and the tube 50, and is discharged through the orifice or opening 55. The screen 53 removes foreign matter from the absorption liquid flowing into auxiliary absorber 47 to prevent clogging of the orifice 55, and the orifice 55 restricts flow of liquid therethrough to limit the rate at which liquid is diverted from conduit 32 into the auxiliary absorber 47.

Under the small pressure head of liquid in conduit 56, absorption liquid spouts upwardly from orifice 55 and strikes the deflecting plate 54. This causes the liquid to flow downwarly over the top closure member 51 onto the surface of the uppermost turn of coil 57. Both the edges of the deflecting plate 54 and top closure member 51 are more or less in vertical alignment with the uppermost turn of coil 57, so that liquid will readily drip from the plate 54 and closure member 51 onto the coil 57. The liquid flows over the exterior surface of coil 57 and forms a liquid film thereon to provide a relatively extensive liquid surface.

The non-condensible gases passing from the bottom of main absorber 14 through conduit 49 into the auxiliary absorber 47 come in intimate contact with the film of absorption liquid on the coil 57. Refrigerant vapor accompanying the non-condensible gases is absorbed into absorption liquid, and the heat liberated with such absorption or refrigerant vapor is transferred to the cooling water flowing through coil 57.

The absorption liquid in the bottom part of the auxiliary absorber 47 enters the upper rounded or bent portion 60 of vertical tube 61 until the portion 60 is completely filled with liquid and sealed from the gases in the bottom part of the auxiliary absorber. When the liquid level rises sufficiently in the bent portion 60 of the tube 61, the small quantity of liquid therein is siphoned into the downwardly depending straight portion of the tube. When liquid siphons from the bent portion 60 of tube 61, the liquid level falls in the bottom part of the auxiliary absorber 47 sufficiently so that non-condensible gases can pass into the bent portion 60. When the liquid level in the bottom part of the absorber 47 again rises sufficiently, the upper bent portion 60 is closed off and a small quantity of liquid is again siphoned into the tube 61. In this way small quantities of non-condensible gases are withdrawn from the bottom part of the auxiliary absorber 47 and trapped between successive bodies or slugs of liquid formed at the upper bent portion 60 of the tube 61.

The tube 61 may be referred to as a fall tube pump and is of such size that flow of liquid is not appreciably restricted, and yet the internal diameter is such that gas and liquid cannot pass each other while flowing downwardly through the tube. When a solution of lithium bromide of about 55% concentration by weight is employed in a system of the type described, a fall tube pump having an internal diameter of about 0.180" has operated in a satisfactory manner to trap small quantities of gas between slugs of liquid.

The gas trapped between slugs of liquid in tube 61 is compressed as the liquid and gas pass downwardly in the tube. From the lower end of tube 61 the trapped gas is discharged into the bottom of conduit 63 which is of considerably greater size than tube 61, so that the gas bubbles will freely pass upwardly through liquid therein, as diagrammatically shown in Fig. 3.

As the quantity of non-condensible gases transferred to conduit 63 and vessel 65 increases, the liquid level in conduit 63 falls due to the gases displacing liquid therefrom. The liquid displaced from conduit 63 passes through conduit 64 into conduit 37. The vacuum pump 66 may be used as desired to exhaust non-condensible gases from conduit 63 and vessel 65 into the atmosphere.

By transferring the non-condensible gases in the system into the conduit 63 and vessel 65, several advantages result. First, the non-condensible gases cannot accumulate in other parts of the system such as the condenser 11 and absorber 14, for example, and occupy and blanket off space in these parts that otherwise would be occupied by refrigerant vapor. Further, objectionable increase of pressure in the condenser and absorber that would result with accumulation of non-condensible gases in these parts is avoided by constantly removing and transferring the gases to a part of the system like that formed by conduit 63 and vessel 65.

By transferring the non-condensible gases in the system to vertical conduit 63 and vessel 65, such gases are removed from all parts of the system actively participating in the production of refrigeration and collected in a single place which might be referred to as an "inactive part." The non-condensible gases accumulating in the inactive part formed by conduit 63 and vessel 65 can reach a pressure considerably greater than that existing in the active parts in both the high and lower pressure sides of the system. For example, in the system like that referred to above and having an ice melting capacity of about five tons, and in which a solution of lithium bromide of about 55% concentration by weight is employed, the pressures in the high and lower pressure sides of the system are about 56 and 9 mm. Hg, respectively. Under these conditions the pressure in vessel 40 above the liquid level e therein is 56 mm. Hg, the pressure existing in the high pressure side of the system.

The maximum pressure that can prevail in vessel 65 and conduit 63 is reached when the liquid falls to the minimum level s in conduit 63. This maximum pressure in conduit 63 in the system referred to above is about 100 mm. Hg, and this pressure is balanced on the high pressure side of the system by the pressure above the liquid level e in vessel 40 and the liquid column extending downwardly from vessel 40 through conduit 39 and one group of passages in liquid heat exchanger 38 to which the lower end of vertical conduit 63 is connected. Thus, while the pressure in the high pressure side of the system is about 56 mm. Hg, the non-condensible gases can be trapped in conduit 63 and vessel 65 to a maximum pressure of about 100 mm. Hg, and at the same time the trapped gases do not adversely affect the normal operation of nor impair the efficiency of the refrigeration system.

The auxiliary absorber 47a illustrated in Fig. 4 differs from that shown in Fig. 2 and described above in that the screen 53a and orifice or metering device 55a are located outside of shell 48a in a separate housing 70. In Fig. 4 cooling water diverted from conduit 44 through conduit 58 is introduced into the lower end of a hollow cylinder or tube 50a extending upwardly within shell 48a. The cooling water passes from the upper curved end of tube 50a into the upper end of a coil 57a disposed about and in thermal contact with the tube. The lower end of coil 57a is connected by conduit 59 to conduit 45 in the same manner as in the first embodiment described above and shown in Fig. 1.

In the embodiment illustrated in Fig. 4 diverted absorption liquid discharged from the lower end of conduit 56 strikes the upper closed end of tube 50a at which region the non-condensible gases enter through conduit 49 from the main absorber 14. The absorption liquid flows along the coil 57a and forms a liquid film therein to provide a relatively extensive liquid surface with which the gases come in contact. Refrigerant vapor accompanying the non-condensible gases is absorbed into the absorption liquid and in this way is removed from the gases. The heat liberated with absorption of refrigerant vapor into solution is transferred to the cooling water flowing through coil 57a. From auxiliary absorber 47a the non-condensible gases are transferred through the fall tube pump 61 to the conduit 63 and vessel 65 in the same manner as in the first embodiment described above.

The embodiment shown in Fig. 5 differs from that illustrated in Fig. 4 in that a solid helical member 57b is disposed about and in thermal contact with tube 50b, and the cooling water circulates entirely within the tube. In Fig. 5 the cooling water diverted from conduit 44 through conduit 58 enters a conduit 71 which is more or less a continuation of conduit 58 and extends upwardly within tube 50b. The cooling water is discharged from the upper end of conduit 71 adjacent the closed upper end of tube 50b and flows down over the exterior surface of conduit 71 and through the tube 50b. The cooling water passes from the lower end of tube 50b into conduit 59.

In Fig. 5 the non-condensible gases enter the auxiliary absorber 47b through conduit 49 and come in contact with absorption liquid entering through conduit 56. The absorption liquid strikes the upper closed end of tube 50b and flows downwardly along the helical member 57b to provide a relatively extensive liquid surface. Refrigerant vapor accompanying the non-condensible gases is absorbed into absorption liquid, and the resulting heat of absorption is transferred to cooling water flowing downwardly within tube 50b.

By providing an auxiliary absorber like the absorbers 47, 47a and 47b described above, refrigerant vapor is effectively removed from the non-condensible gases, so that substantially no refrigerant vapor accompanies the non-condensible gases trapped in the upper end of fall tube pump 61. With substantially no refrigerant vapor entering the fall tube pump 61, practically no absorption of refrigerant into absorbent takes place in the fall tube pump to produce objectionable noises and undesirable slowing down of the rate at which gas is transferred from absorber 14 to vertical conduit 63. Hence, the auxiliary absorbers serve to effect withdrawal of non-condensible gases at a maximum rate into the fall tube pump 61. In addition, since the absorption liquid diverted into the auxiliary absorbers 47, 47a and 47b is weak in refrigerant while the absorbent in the bottom of the main absorber 14 is rich in refrigerant, the vapor pressure of refrigerant in the auxiliary absorbers is less than that at the bottom of the main absorber. This slight pressure differential promotes positive flow of non-condensible gases from the main absorber 14 through conduit 49 to the auxiliary absorber. When both refrigerant vapor and non-condensible gases enter the fall tube pump and refrigerant is absorbed into solution in the latter, non-condensible gases pass from the main absorber at an extremely slow rate approaching a more or less stagnant flow similar to flow of gases by diffusion. However, by removing refrigerant vapor from the non-condensible gases in the auxiliary absorber and causing the gases to flow from the main absorber to a region of slightly lower pressure in the auxiliary absorber, extremely rapid flow of non-condensible gases from the main absorber is effected.

In each embodiment illustrated and described, the helical member of the auxiliary absorber, over which the absorption liquid flows, fits snugly against a cylindrical part. With this arrangement liquid disturbances are created as liquid descends from one turn onto a part of the cylindrical wall and from the latter onto the next successively lower turn. In this way fresh liquid surfaces are constantly provided to improve absorption of refrigerant vapor into absorbent.

The auxiliary absorber 47 is especially effective in that a relatively extensive liquid film is formed on coil 57 with which the gases come in contact. The heat of absorption resulting from absorption of refrigerant vapor into solution is transferred from the liquid film directly through the coil 57 to the cooling water flowing therein. In addition, absorption liquid flowing over the exterior surface of tube 50 increases the effective gas and liquid contact surface. The heat of absorption resulting from absorption of refrigerant vapor into solution at the outside surface of tube 50 is also transferred to cooling water within the coil 57. Further, the coil throughout its length is in heat exchange relation with tube 50, so that effective precooling of absorption liquid within tube 50 is effected before such liquid is discharged through the orifice 55 and flows over the exterior surface of the coil 57. By providing an arrangement in which the absorption liquid is kept at as low a temperature as possible the more effectively is refrigerant vapor absorbed into solution, and the non-condensible gases passing into the tube 61 will be deprived of as much refrigerant vapor as possible.

The auxiliary absorbers 47a and 47b likewise are effective in producing a positive flow of non-condensible gases through conduit 49. As in the auxiliary absorber 47, the cooling water in the embodiments illustrated in Figs. 4 and 5 flows in heat exchange relation with absorption liquid along substantially the entire length of the path of flow of the absorbent. Thus, in Fig. 4 the heat of absorption resulting from absorption of refrigerant vapor at the surfaces of coil 57a and exterior surface of tube 50a is immediately taken up by cooling water flowing within the tube 50a and also through the coil 57a. Moreover, the coil 57a is arranged in thermal contact with tube 50a in such a manner that the bottom end of the coil is in heat exchange relation with the end of the tube 50a which is the coolest and into which the cooling liquid is introduced through conduit 58.

Similarly, in the auxiliary absorber 47b illustrated in Fig. 5, the heat of absorption resulting from absorption of refrigerant vapor at the liquid film formed on helical coil 57b and at the exterior surface of tube 50b, is immediately taken up by cooling liquid flowing downwardly through tube 50b. By positioning conduit 71 within tube 50b in the manner illustrated, the cooling water leaving the tube through conduit 49 is in heat exchange relation with liquid entering conduit 71 through conduit 58. By effectively cooling auxiliary absorbers 47a and 47b in the manner just described, the auxiliary absorbers are maintained at as low a temperature as possible. In this way refrigerant vapor is effectively absorbed into solution and the non-condensible gases removed from the auxiliary absorbers 47a and 47b will be deprived of as much refrigerant vapor as possible.

While several embodiments of the invention have been shown and described, it will be apparent to those skilled in the art that various modifications and changes may be made without departing from the spirit and scope of the invention, as pointed out in the following claims.

What is claimed is:

1. A refrigeration system operable below atmospheric pressure and comprising a plurality of parts including a first absorber interconnected for circulation of absorption liquid and refrigerant, and means including an auxiliary absorber for withdrawing non-condensible gases from said first absorber, said auxiliary absorber comprising a casing providing a chamber within which is disposed an upright annular member, a helical member fitting snugly about said annular member in direct contact therewith and extending lengthwise thereof, and means to flow absorption liquid onto an upper part of said helical member, said annular member and helical member forming a path of flow for absorption liquid in which liquid descends from one turn of said helical member onto a part of said annular wall and from the latter onto the next successively lower turn of said helical member, so that fresh liquid surfaces are constantly being provided with which non-condensible gases from said first absorber come in contact for removing refrigerant vapor accompanying such gases.

2. A refrigeration system operable below atmospheric pressure and comprising a plurality of parts including a first absorber interconnected for circulation of absorption liquid and refrigerant, and means including an auxiliary absorber for withdrawing non-condensible gases from said first absorber, said auxiliary absorber comprising a casing providing a chamber within which is disposed a vertically extending wall member, means bearing against said wall member and forming a plurality of horizontally disposed barriers at different levels, means to flow absorption liquid onto one of said barriers at the upper part of said wall member, said wall member and barriers forming a relatively extensive gas and liquid contact surface with absorption liquid passing from one barrier onto a part of said wall member and from the latter onto the next successively lower barrier, so that fresh liquid surfaces are constantly being provided with which non-condensible gases from said first absorber come in contact for removing refrigerant vapor accompanying such gases.

3. A refrigeration system operable below atmospheric pressure and comprising a plurality of parts including a first absorber interconnected for circulation of absorption liquid and refrigerant, and means including an auxiliary absorber for withdrawing non-condensible gases from said first absorber, said auxiliary absorber comprising a casing providing a chamber, a hollow cylindrical member within said chamber having top and bottom closure plates, a helical coil fitting snugly about said cylindrical member in direct contact therewith and extending lengthwise thereof, an annular screen within and spaced from said cylindrical member, means for introducing absorption liquid within said annular screen, said top closure plate having an opening through which liquid is discharged upwardly from within said cylindrical member, means including a plate positioned above said cylindrical member for deflecting liquid discharged through the opening onto said coil, said cylindrical member and coil forming a downward path of flow for absorption liquid, and means for flowing a cooling medium through said coil.

4. A refrigeration system operable below atmospheric pressure and comprising a plurality of parts including a first absorber interconnected for circulation of absorption liquid and refrigerant, and means including an auxiliary absorber for withdrawing non-condensible gases from said first absorber, said auxiliary absorber comprising a casing providing a chamber within which is disposed an upright hollow cylinder, a helical coil fitting snugly about said cylinder in direct contact therewith and extending lengthwise thereof, means to flow a cooling medium through said helical coil, and means to flow absorption liquid onto an upper part of said coil, said cylinder and coil forming a path of flow for absorption liquid in which liquid descends from one part of said coil onto a part of said cylinder and from the latter onto the next successively lower turn of the coil, so that fresh liquid surfaces are constantly being provided with which non-condensible gases from said first absorber come in contact for removing refrigerant vapor accompanying such gases.

5. A refrigeration system operable below atmospheric pressure and comprising a plurality of parts including a first absorber interconnected for circulation of absorption liquid and refrigerant, and means including an auxiliary absorber for withdrawing non-condensible gases from said first absorber, said auxiliary absorber comprising a casing providing a chamber within which is located a vertically disposed hollow cylindrical member, a helical coil disposed about and extending lengthwise of said cylindrical member, means for introducing a cooling medium to the lower part of said cylindrical member, the upper end of said coil being connected to the upper part of said cylindrical member so that cooling medium flows downwardly through said coil, and means to flow absorption liquid onto an upper part of said coil, said coil and cylindrical member forming a path of flow for absorption liquid in which liquid descends from one turn of said coil onto a part of said cylindrical member and from the latter onto the next successively lower turn of said coil, so that fresh liquid surfaces are constantly being provided with which non-condensible gases from said first absorber come in contact for removing refrigerant vapor accompanying such gases.

6. A refrigeration system operable below atmospheric pressure and comprising a plurality of parts including a first absorber interconnected for circulation of absorption liquid and refrigerant, and means including an auxiliary absorber for withdrawing non-condensible gases from said first absorber, said auxiliary absorber comprising a casing providing a chamber within which is disposed an upright hollow cylindrical member, a helical element snugly fitting about and extending lengthwise of said member, means for circulating cooling medium within said cylindrical member, and means to flow absorption liquid onto an upper part of said element, said helical element and cylindrical member forming a path of flow for absorption liquid in which liquid descends from one turn of said element onto a part of said cylindrical member and from the latter onto the next successively lower turn of said element.

7. A refrigeration system operable below atmospheric pressure and comprising a plurality of parts including a first absorber interconnected for circulation of absorption liquid and refrigerant, and means including an auxiliary absorber for withdrawing non-condensible gases from said first absorber, said auxiliary absorber comprising a casing providing a chamber within which is located a vertically disposed hollow cylindrical member, a tube extending upwardly within said member and terminating in the upper part thereof, means for supplying cooling medium to said tube, said cylindrical member having an outlet for the cooling medium in the lower part thereof, a helical element snugly fitting about and extending lengthwise of said member, and means to flow absorption liquid onto an upper part of said element, said element and cylindrical member forming a path of flow for absorption liquid in which liquid descends from one turn of said element onto a part of said cylindrical member and from the latter onto the next successively lower turn of said element.

8. A refrigeration system operable below atmospheric pressure and having a plurality of active parts, said active parts being interconnected for circulation of absorption liquid and refrigerant, and means including an absorber for withdrawing non-condensible gas from one of said active parts, said absorber having a vertically disposed cylindrical wall, a vertically extending pipe coil directly contacting a surface of said wall, said absorber being connected to receive non-condensible gas from said one active part, and means for flowing absorption liquid onto an upper part of said coil, said cylindrical wall and coil forming a path of flow for absorption liquid in which liquid descends from one turn of said coil onto a part of said surface and from the latter onto the next successively lower turn of said coil.

9. A refrigeration system operable below atmospheric pressure and comprising a plurality of active parts including a first absorber interconnected for circulation of absorption liquid and refrigerant, a vertically extending tube embodied in the system and through which absorption liquid flows, the upper end of said tube being in communication with said first absorber, and means including said tube for withdrawing non-condensible gas from said first absorber, said means including an auxiliary absorber for localizing the non-condensible gas flowing from said first absorber and for removing therefrom accompanying refrigerant vapor, said auxiliary absorber including a vertically disposed cylindrical wall and a pipe coil directly contacting a surface of such wall, and means for flowing absorption liquid onto an upper part of said coil, the refrigerant vapor accompanying the non-condensible gas from said first absorber being absorbed into absorption liquid in said auxiliary absorber whereby gas substantially free of refrigerant is entrained by absorption liquid at the upper end of said tube.

10. In an absorption refrigeration system comprising a plurality of elements including an absorber interconnected to provide a closed circuit for the circulation of a refrigerant and absorption liquid, an auxiliary absorber connected to the absorber for receiving non-condensible gases therefrom, means for supplying absorption liquid weak in refrigerant to the auxiliary absorber, said auxiliary absorber utilizing the absorption liquid to absorb refrigerant vapor and create a relative partial vacuum whereby to cause flow of the gases from the absorber to the auxiliary absorber, means for supplying a cooling medium to the auxiliary absorber to remove the heat of absorption, and means for withdrawing non-condensible gases from the auxiliary absorber.

11. In an absorption refrigeration system comprising a generator and condenser operable at one pressure and an evaporator and absorber operable at a lower pressure, means interconnecting the elements to provide a closed circuit for the circulation of a refrigerant and absorption liquid and maintain the pressure differential, an auxiliary absorber connected to the low pressure side of the system to receive non-condensible gases therefrom, means for supplying absorption liquid weak in refrigerant to the auxiliary absorber, said auxiliary absorber utilizing the absorption liquid to absorb refrigerant vapor to cause a flow of the gases thereto, means for supplying a cooling medium to the auxiliary absorber to remove the heat of absorption, and means for withdrawing non-condensible gases from the auxiliary absorber.

12. In an absorption refrigeration system comprising a generator and condenser operable at one pressure and an evaporator and absorber operable at a lower pressure, means interconnecting the elements to provide a closed circuit for the circulation of a refrigerant and absorption solution and maintain the pressure differential, said last named means providing separate paths of flow between the generator and absorber for absorption liquid weak in refrigerant and absorption liquid strong in refrigerant, a by-pass connected between the separate paths of flow to cause absorption liquid weak in refrigerant to flow therethrough, an auxiliary absorber in the by-pass and connected to the low pressure side of the system to receive non-condensible gases therefrom, said auxiliary absorber utilizing the absorption liquid flowing therethrough for absorbing refrigerant vapor to cause a flow of gases thereto, means for supplying a cooling medium to the auxiliary absorber to remove the heat of absorption, and a fall tube pump in the by-pass for withdrawing the non-condensible gases from the auxiliary absorber.

CHARLES ALFRED ROSWELL.